US006496504B1

United States Patent
Malik

(10) Patent No.: US 6,496,504 B1
(45) Date of Patent: *Dec. 17, 2002

(54) SMART ALLOCATION OF BANDWIDTH FOR MULTIPLE INDEPENDENT CALLS ON A DIGITAL NETWORK

(75) Inventor: Naeem Iqbal Malik, Fremont, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/129,892

(22) Filed: Aug. 6, 1998

(51) Int. Cl.[7] .............................. H04L 12/28; H04J 3/16; H04J 3/12
(52) U.S. Cl. ...................... 370/390; 370/468; 370/524
(58) Field of Search ............................... 358/434, 400, 358/405; 709/238, 250, 227, 226; 370/392, 390, 431, 410, 468, 524, 264, 432, 385, 395.1, 395.2, 381, 384

(56) References Cited

U.S. PATENT DOCUMENTS

| 4,805,167 A | | 2/1989 | Leslie et al. | |
|---|---|---|---|---|
| 4,985,891 A | * | 1/1991 | Fujiwara et al. | 370/524 |
| 5,448,559 A | * | 9/1995 | Hayter et al. | 370/468 |
| 5,533,108 A | * | 7/1996 | Harris et al. | 379/201.03 |
| 5,577,035 A | * | 11/1996 | Hayter et al. | 370/395.4 |
| 5,675,576 A | * | 10/1997 | Kalampoukas et al. | 370/390 |
| 5,790,641 A | * | 8/1998 | Chan et al. | 358/434 |
| 5,802,049 A | * | 9/1998 | Watanabe | 370/390 |
| 5,832,240 A | * | 11/1998 | Larsen et al. | 710/105 |
| 5,963,552 A | * | 10/1999 | Joo et al. | 370/395.32 |
| 6,081,841 A | * | 6/2000 | Malik | 370/524 |
| 6,097,720 A | * | 8/2000 | Araujo et al. | 370/390 |
| 6,144,661 A | * | 11/2000 | Katsube et al. | 370/390 |
| 6,304,579 B1 | * | 10/2001 | Malik | 370/390 |

FOREIGN PATENT DOCUMENTS

WO      WO 96/27975      9/1996

* cited by examiner

Primary Examiner—Chau Nguyen
Assistant Examiner—Andrew Lee
(74) Attorney, Agent, or Firm—Oblon, Spivak, McClelland, Maier & Neustadt, P.C.

(57) ABSTRACT

A method and apparatus in a computer network system form a setup message at a source terminal. The setup message includes a bandwidth coordination message that identifies respective subchannel data rates to be used when sending data to respective destination terminals. The setup message identifies respective data rates and associated destination terminals, and the setup message is sent to a switch facility, that interconnects the source terminal and the respective destination terminals. The switch extracts the bandwidth coordination message and establishes subchannel links, such as subchannels of one or two ISDN B channels. Once the respective links are established, the source terminal transmits a message via the switch to the respective destination terminals at the data rates corresponding with the subchannel data rates established by the switch facility, and as requested by the source terminal.

13 Claims, 13 Drawing Sheets

| FL | B1 | L | D | L | FaL | B2 | L | D | L | B1 | L | D | L | B2 | L | D | L |

200

(Background Art)

Fig. 2

SMART ALLOCATION OF BANDWIDTH FOR MULTIPLE INDEPENDENT CALLS ON A DIGITAL NETWORK

CROSS-REFERENCE TO RELATED APPLICATIONS

This application contains subject matter related to that disclosed in application Ser. No. 08/841,655 filed on Apr. 30, 1997, now U.S. Pat. No. 6,104,505 entitled "A method and Apparatus For Routing Data Information Conveyed In A Facsimile Message"; application Ser. No. 08/955,353 filed on Oct. 21, 1997 now U.S. Pat. No. 5,938,735 entitled "Method And Apparatus For Establishing Optimized ISDN Communication Conditions"; application Ser. No. 09/021, 566, filed Feb. 10, 1998, now U.S. Pat. No. 6,081,841 "entitled Method and Apparatus for Expanding Data Rate In An ISDN Communication System", commonly owned application Ser. No. 09/110,078, filed Jul. 2, 1998, now U.S. Pat. No. 6,304,579 entitled "Method and Apparatus for Sending a 1×N Communication Message", each of which having common inventorship, and the contents of all of which being incorporated herein by reference.

BACKGROUND OF THE INVENTION

1. Field of the Invention

The present invention pertains to communication systems and methods for communicating information over digital networks, such as an Integrated Services Digital Network (ISDN). In particular, the present invention pertains to establishing over an ISDN D channel one or more data rate selectable communication links between a source terminal and one or more destination terminals via a modified ISDN switch. The modified ISDN switch handles the aggregate bandwidth of two ISDN B channels as a common resource that is available for subdivision and allocation to one or more links to the one or more destination terminals. The aggregation of the two ISDN B channels, as well as the subdivision of the bandwidth afforded thereby, is performed without requiring the source and destination terminals to perform bonding or multilink protocol processes.

2. Discussion of the Background

Conventional facsimile devices communicate over the Public Switch Telephone Network (PSTN) using analog signals that are transmitted over conventional telephone lines. The source terminal (e.g., a facsimile device, computer with scanner and modem facilities, or another device that transmits and/or receives data) converts digital scanned information into a corresponding analog signal so the same may be sent over the PSTN telephone line, via a telephone switch facility, to the destination terminal. The source terminal receives the analog information and converts the analog information back into digital signals which form the basis of an image to be printed, perhaps on facsimile paper.

The Integrated Services Digital Network (ISDN) is emerging as a next generation worldwide public telecommunications network that will replace portions of the existing PSTN and provide a variety of services not offered by the PSTN. ISDN will allow for the transmission of various types of data between various types of ISDN terminal equipment (TE).

A portion of the ISDN link between a source terminal and a central office, which has a switch facility, is referred to as a "digital pipe". A capacity of the digital pipe is generally discussed in terms of separate channels. In particular, a "basic access" digital pipe includes two B channels (basic channels) that each support 64 kbps signaling, and a D channel at 16 kbps. While the total bit rate of these three channels is 144 kbps, framing, synchronization and other overhead bits bring the total bit rate of a basic access link to 192 kbps. Furthermore, the B channels serve as separate communication channels such that the maximum data capacity, as view by the user, is 64 kbps per B channel, and 16 kbps for the D channel, not 192 kbps.

Conventional facsimile devices, such as G3 devices, send signals at rates not exceeding 64 kbps, because only one of the two B channels is used. Because facsimile data is arranged in a predetermined format, sending data over two separate B channels would be a sizable task because conventional ISDN switches handle the B channels separately, and thus may send data of one of the B channels over a completely different route than that of the other B channel. As a consequence, the different communication paths impose different communication delays on the respective B channels.

Other devices such as video teleconference facilities, assume the processing burden of "bonding", or employing multilink point-to-point (multilink PPP) protocols, so as to increase data rates approaching 128 kbps. The bonding approach imposes a burden on the customer premise equipment (CPE) of dialing the ISDN switch and establishing the subsequent calls needed to achieve the desired data rate. Thus, two separate links are established. In particular, by assuming the burden of maintaining two separate communication connections with the ISDN switch, the CPE can give the appearance to a user that a 128 kbps channel is available to the user. However, the bonding approach is cumbersome in that the ISDN switch assumes each of the B channels may be handled independently, and therefore impart different delays into the separate B channels. As a consequence, the CPE must compensate for the delays between the respective B channels, and piece together the received and transmitted information so as to avoid synchronization problems.

Multilink PPP schemes attack the same problem from a different approach, although also placing a similar processing and data management burden on the CPE. The multilink PPP schemes use a conventional ISDN switch and attempts to make the ISDN switch oblivious to the operation of combining B channels to provide an effective data rate approaching 128 kbps. The multilink protocol involves dividing the user's source data into specific fragments, including overhead information in the respective packets, so that the packets may be sent over all available channels, and later recombined in a contiguous fashion. As with bonding, multilink PPP places a computational and management burden on the CPE, rather than at the ISDN switch.

As recognized by the present inventor, a limitation with conventional ISDN networks and the source and destination terminals that operate therewith, is that the B channels are identified as static, fixed-bandwidth channels that may not be fully utilized by either the source or destination terminals. Moreover, while each B channel is allocated 64 kbps, a source or destination terminal may or may not be able to support the data rate, and thus may use the channel at lower data rates. However, the capacity for the channel remains at 64 kbps, and thus unless the source and destination terminals actually use a full 64 kbps signaling scheme, a portion of the available bandwidth (related to signaling speed) is wasted.

In light of this limitation, the present inventor identified that the "subchannelization" of one or more ISDN B channels is not performed with conventional systems, but would be beneficial if the subchannelization allowed the "wasted" portion of the bandwidth to be used for other communication tasks. Moreover, if a modified ISDN switch were available that could receive a message, or messages, from the source terminal, and route the message, or messages, as subchannel messages to one or more destination terminals at a user-selectable subchannel bandwidth (i.e., data rate), significantly greater flexibility in terms of end-user communication speed, accessibility, and user-friendly operation could be achieved.

Conventionally, the function served by the ISDN D channel, is twofold. First, the D channel is used to establish and maintain signaling between the CPE and the ISDN switch (operated by the telephone company). Thus, the D channel carries signaling information such as that required for dialing the telephone number of the destination terminal and making the connection between the source terminal and the destination terminal. A more complete description of the D channel as employed in narrowband and broadband ISDN, as well as ISDN terminal equipment, protocols, data rates, etc. is provided in the literature, for example in Stallings, W., "Data and Computer Communications", $5^{th}$ Edition, Prentice Hall, 1997, pages 740–769 (hereinafter "Stallings"), the contents of this book being incorporated herein by reference.

FIG. 1 is a block diagram of a conventional ISDN system 100 having a source facsimile 10 at a source facility 1 that communicates via an ISDN switch 22 to a destination facsimile 16 (or other type of destination terminal, such as a computer, ISDN equipped photocopier, etc.) in a destination facility 2. The source facsimile 10 communicates via a terminal adapter 10A, shown as an internal device, although a separate external terminal adapter may be used as well. The terminal adapter 10A provides a protocol (physical layer and intermediate layer) conversion function for converting signal protocols such as V.35, RS-232, Universal Serial Bus (USB), IEEE 1394 (FireWire), etc. to an ISDN compliant protocol over a 4-wire interface. In the source facility 1, the bonding or multilink PPP mechanism may be incorporated in the source terminal 10, terminal adapter 10A or in the NT1 14.

The NT1 14 connects the source facilities 1, via a two-wire line 15, to a switching module 26 located at the ISDN switch 22. Alternatively, a second network termination (NT2) may be used at the source facility 1 between NT1 and the terminal adapter to provide a switching and concentration function, such as with a digital private branch exchange (PBX). Likewise, the NT1 may be replaced with a NT12 that performs the functions of both the NT1 and NT2.

At the ISDN switch 22, the switching module 26 connects to a processor 24 and another switching module 28 via a bus 27, which allows digital commands and data to be passed between the respective switching modules 26 and 28, and the processor 24.

The equipment at the destination facility 2 may or may not be exactly similar to that of the source facilities 1. In the system shown in FIG. 1, the destination facility 2 includes the destination facsimile 16 having a terminal adapter 16A incorporated therein, which connects to another NT1 20 as shown. The NT1 20 connects to the switching module 28 in the ISDN switch 22, via another two-wire line 17 as shown. Several subaddresses 16S1–16SN may connect to the destination facsimile 16 by way of separate dedicated lines 18S1 to 18SN.

ISDN communications is based on a seven layer protocol stack, as explained in reference to FIG. A.5 of Stallings, for example. Control signaling is accomplished between the respective user-network interface and occurs at a third layer of the protocol stack (i.e., the "network" layer) and is named I.451/Q.931. Thus, establishing and maintaining control signaling for a communication link is established between the source facility 1 and a destination ISDN facility 2 through the D channel, and in particular, the ISDN network layer, data link layer and physical layer.

FIG. 2 is a frame structure 200 of a transmission from the source facilities 1 to the ISDN switch 22, for an ISDN basic rate access. The frame structure 200 includes 48 bits which are transmitted in 250 $\mu$sec. Components of the frame structure 200 include framing bits, F, dc balancing bits, L, B channel bits for the first B channel (16 per frame), B1, B channel bits for the second B channel (16 bits per frame), B2, D channel bits (4 per frame), D, auxiliary framing bit, Fa. A more detailed description of the frame structure, as well as a corresponding frame structure for the frames sent from the ISDN switch 22 to the source facilities 1, is described in Stallings, pp 212–215.

A link access protocol (LAPD) D channel is defined for establishing particular LAPD frames that are exchanged between the subscriber equipment (either at the source facility 1 or at the destination facility 2) and the ISDN switch 22. The call control protocol I.451/Q.931 is used on the D channel to establish, maintain and terminate connections on B channels.

The D channel is primarily used for signaling purposes and is used to dial the number of the destination terminal and establish the connection by which the data is transmitted from the source terminal 1 to the destination terminal 2 over the B channels. However, as presently recognized, once the D channel connection is established, the D channel may continue to be used free of charge to receive another call or to make additional connections for the second line, third line or the like, provided that the subchannelization feature is incorporated into the ISDN architecture. Thus, a synergistic effect of combining subchannelization with aggregating two B channels is that the common D channel allows for all the information regarding setup connections to be done by the D channel, without an additional charge to the ultimate users.

FIG. 3 illustrates the signaling sequence between the source facility 1 and the ISDN switch 22. In order to establish each B channel connection between the source facility 1 and the destination facility 2, an initial communication link must be established on the D channel between the source facility 1 and the destination facility 2. To this end, a series of messages is sent back and forth between the source facilities 1 and the ISDN switch 22. This communication between the source facilities 1 and ISDN switch 22 occurs on a continuing basis on the D channel, while communications are maintained between the source facilities 1 and destination facilities 2 on one of the B channels. As shown in FIG. 3, several different messages are sent between the source facilities 1 and ISDN switch 22 while the D channel is maintained. A similar, redundant procedure is performed when the second B channel is established for bonding or multilink PPP purposes.

The direction of the arrows in FIG. 3 indicates a direction of communication between the source facilities 1 and the ISDN switch 22. The process for establishing a connection is initiated by the source facilities 1 by first sending a setup message. Particular features of the setup message will be discussed with respect to FIG. 4, however the purpose of the setup message is to provide general information regarding the request to connect to the ISDN switch 22. Next, the ISDN switch 22 responds with a call proceeding message that indicates that call establishment has been initiated. Subsequently, the ISDN switch 22, sends a connect message that indicates call acceptance by the source facilities 1. The source facilities 1 then sends a connect acknowledge signal that indicates the user has been awarded the call. When the user wishes to disconnect a call, the user sends a disconnect message via the source facilities 1 to the ISDN switch 22, requesting connection clearing. In response, a release message is sent from the ISDN switch 22, indicating the intent to release the channel and call reference. In response the source facilities 1 issues a release complete message, indicating that the release of the channel and the call reference. Subsequently, the call and information flow through the B channel is terminated.

FIG. 4 shows the structure of a conventional ISDN D channel setup message. The setup message includes respective LAPD frames (e.g., 501, 503 . . . ) of different sizes (measured in octets). The message includes a flag frame 501 that is one octet in length, followed by a service access point identifier (SAPI) frame 503 having a command/response bit (CR) and address field extension bit (0). The SAPI frame 503 is joined with the terminal end point identifier (TEI) frame 505, each of which are one octet in length. A control frame 507, is one or two octets in length, and is followed by an information frame 509, which has a variable length between 0 and 128 octets. A frame check sequence frame 511 follows and occupies two octets in length. An end frame 513 serves as an end of setup message flag.

The SAPI frame 503 includes a first subfield "SAPI", that identifies a protocol layer-3 user, as well as subframes C/R and 0, that are used as a predetermined formatting feature of SAPI. The terminal end point identifier frame 505, is used to provide a unique terminal end point identifier that is used to identify the user's equipment. The control frame 507 defines the type of frame format that will be employed such as an information frame, supervisory frame, and unnumbered frame for example. The information frame 509, includes a variable number of octets varying from 0 to 128 and contains respective subfields that contain any sequence of bits that form an integer number of octets.

Thus, when a user wishes to send data to a destination, information in the information field is passed directly to the destination user without the ISDN switch deciphering the contents of the information. Following the information field 509, the frame check sequence 511 is included and performs an error-detection function by calculating a code from the remaining bits of the frame, exclusive of the flags. The normal code is a cyclical redundancy check code. Finally, the end flag frame 513, includes a specific code indicating the end of the setup message.

As identified by the present inventor, a limitation with the conventional ISDN setup architecture is that there is no suitable approach for arranging a single 128 kbps connection between a source terminal and a destination terminal, by way of the ISDN switch. Nor does the conventional ISDN setup architecture enable the feature of subchannelization, or 1×N communications as discussed in co-pending Application entitled "Method and Apparatus for Sending a 1×N Communication Message". Because the conventional ISDN switch handles the different B channels independently, the ISDN switch imparts a significant degree of uncertainty regarding the communications paths assigned to different B channels that both have common origins and destinations—the net result being different, and perhaps non-static, interchannel delay. Conventional bonding and multilink PPP based systems overcome the delay obstacle imposed by the ISDN switch by employing more expensive and complex source and destination equipment so as to accommodate the processing and management overhead for "combining" two B channels. Furthermore, many conventional ISDN terminals such as G3 facsimile machines, are not configured to communicate over a 128 kbps link, as it is presumed that no more than 64 kbps is available for facsimile transmissions. Neither do conventional ISDN terminals, such as G3 facsimile machines, enable the operation of subchannelization, where channel speeds range from 1 kbps to 128 kbps depending on usage demands/requests.

SUMMARY OF THE INVENTION

Accordingly one object of the present invention is to provide a novel method, apparatus and system that provides expanded data rates in ISDN networks and subchannelization of ISDN channels for use in 1×N messaging that overcomes the above limitations of existing methods, apparatuses and systems.

It is a further object of the present invention to provide a source ISDN terminal configured to transmit a request message to a network switch, indicating that the source terminal requests that the network switch handle one or both B channels as a composite channel for transmission of one or more subchannels having a composite data rate of up to 128 kbps.

It is yet another object of the present invention to provide a method and network switch that establishes the composite channel with subchannelization between the source terminal and one or more destination terminal(s).

These and other objects are achieved with an inventive method, apparatus and system that forms a setup message at a source terminal, a non-exhaustive description of which follows. The setup message includes a request for subchannelization of one or both B channels so as to maximize communication efficiency when sending a 1×N message to one or more destination facilities, or separate messages to one or more facilities. The source terminal sends the setup message with the request to the switch, where the switch invokes a channel and bandwidth coordination mechanism that subdivides the bandwidth of one or both B channels for communication between the source terminal, and one or more destination terminals. The setup message also indicates whether or not a 1×N extension message is included.

When a data message is sent to more than one destination facility, a request is made for a desired data rate to be used for each of the destination facilities identified in the setup message. The switch then determines whether both B channels are needed to support the communication request made by the source terminal and determines whether the communication resources are available at the identified destination terminal(s). When one of the destination terminal(s) cannot support the requested communication capacity requested by the source terminal, that destination terminal offers a counter proposal to at least one of the switch and/or source terminal. If the counter proposal is accepted by the source terminal and/or switch, the switch changes the communication speed to that destination terminal. In this way, the communication capacity of one or both of the B channels is optimized when sending either a regular data message or a 1×N extension message to one or more destination terminals.

A facet of the present invention is the use of a modified ISDN switch, modified to handle two B channels as a single channel, the combined channel capacity of which may be subchannelized based on user requests. The modified switch includes a processor-based channel and bandwidth coordination mechanism configured to determine if a source terminal requests subchannelization of one or both B channels and coordinates the allocation of the available bandwidth from the one or both of the B channels to respective destination facilities identified as recipients of the message(s) from the source terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a conventional frame structure for communicating between a source terminal and an ISDN switch in ISDN basic rate access;

DESCRIPTION OF THE PREFERRED EMBODIMENTS

Figure 5:
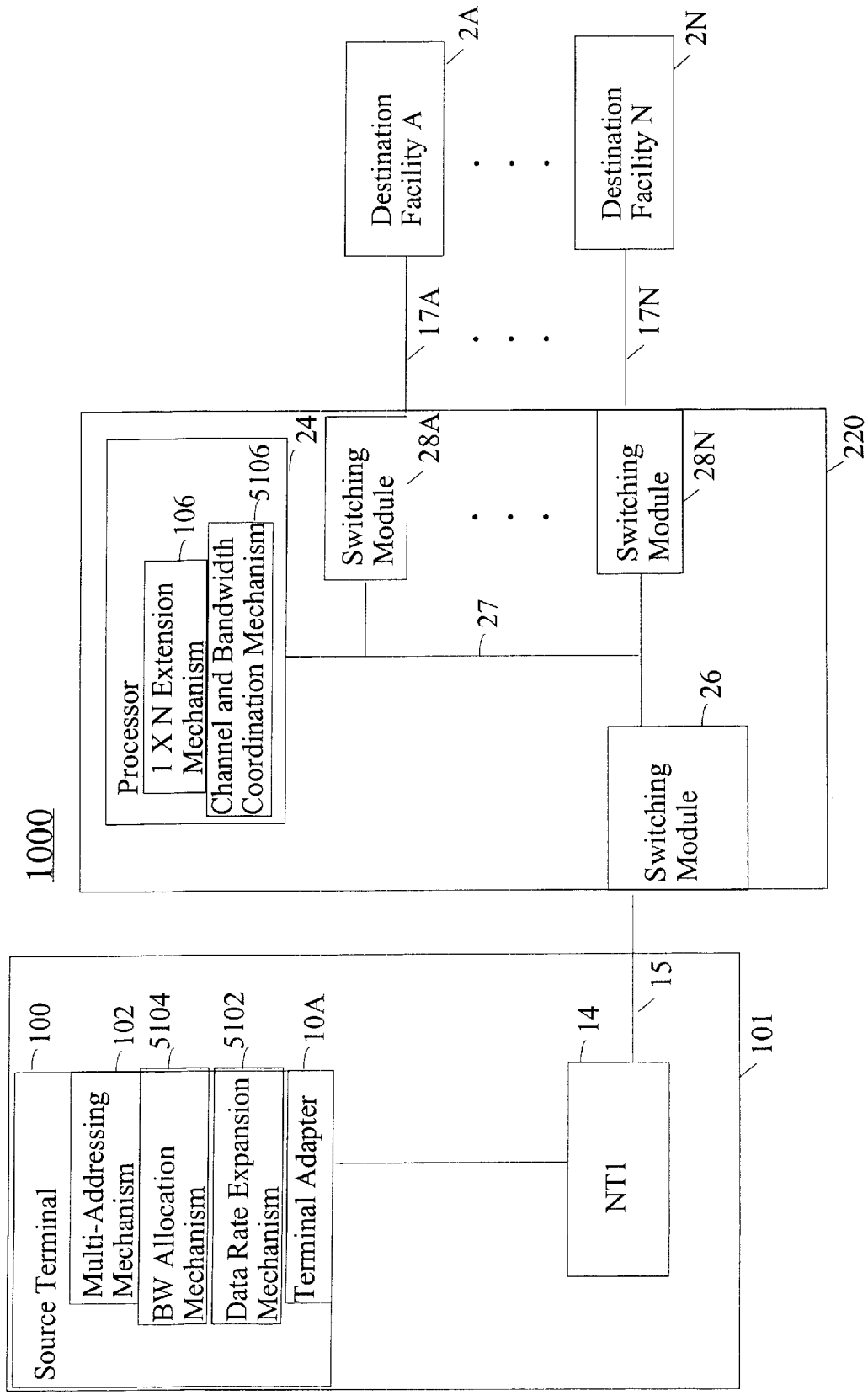
FIG. 5 is a block diagram of smart bandwidth allocation system including a data rate expansion mechanism and a channel and bandwidth coordination mechanism according to the present invention.

Referring now to the drawings, wherein like reference numerals designate identical or corresponding parts throughout the several views, and more particularly to FIG. 5 thereof, there is illustrated a modified integrated digital service network (ISDN) system 1000 in which a source terminal 100 of a source facility 101 communicates with multiple destination facilities 2A to 2N via an ISDN switch 220, modified to provide a 1×N switch function and subchannelization function, as will be explained herein. The source terminal 100 is included in the source facilities 101, located at a user site and as part of the customer provided equipment (CPE). The source terminal 100 includes a multi-addressing mechanism 102, bandwidth allocation mechanism 5104, data rate expansion mechanism 5102, each of which will be discussed herein, a terminal adapter 10A and a network termination 1 (NT1) 14. Alternatively, only a single NT1 is used at the source facilities 101 and at the respective destination facilities 2A to 2N. Connected to the NT1 14 is a two wire ISDN line 15 that physically connects the source facilities 101 to the ISDN switch 220.

While the present embodiment is directed to an ISDN application, the present invention may be employed with other network configurations as well. For example, the switch 220 and switch-based network 1000 may be incorporated into a frame relay system, a switch 56 system, an asynchronous transfer mode (ATM) system, and an asynchronous digital subscriber line (ADSL) system, to name a few. Furthermore, the present invention may be employed in a digital network of open bandwidths, in which the source terminal 101 communicates via a multilingual switch (multilingual meaning able to support multiple communication protocols) to multiple destination facilities that use network protocols that may or may not be different than that used at the source terminal. For example, the source terminal may use an ISDN line to connect to the digital network of open bandwidth switch, which recognizes and receives the information contained in the ISDN format, and sends a copy of the message to a first destination facility, which may communicate in a frame relay context, for example. Similarly, another copy of the message may be sent to another destination facility, say an ATM network. The digital network of open bandwidth switch, which provides this translation function, communicates with the respective destination facilities in order to determine which communication protocols are supported thereby. Alternatively, the digital network of open bandwidth switch incorporates a memory that holds an indicator that indicates which protocol is supported by the respective destination facilities.

In the present embodiment, the ISDN switch 220 includes a processor 24 (e.g., one or more discrete central processing units), with associated memory (e.g, RAM, ROM, and or mass storage), interface devices, etc., switching modules 26, 28, and bus 27. An example of a suitable processor 24, with switch modules 26, 28A to 28N is the 5ESS SWITCH available from AT&T, although appropriately modified to include the 1×N extension mechanism 106 and the channel and bandwidth coordination mechanism 5106, both of which will be explained herein. The switching modules 28A to 28N are connected via the bus 27 to the first switching module 26 and the processor 24. The switching modules 28A to 28N are also connected to respective two wire ISDN lines 17A to 17N, which in turn are connected to the NT1s of the destination facilities 2A to 2N.

An example of the source terminal 100 or destination terminals 2A to 2N is a Ricoh FAX-4700L, which includes a G4 option, and Ricoh RS232PC-fax expander, for example, appropriately modified to include the multi-addressing mechanism 102, bandwidth allocation mechanism 5104, and data rate expansion mechanism 5102, preferably realized as software modules. The source terminal 100 is configured to send information to the destination terminal in various forms, such as facsimile images through the G4 facsimile convention, audio, video, or other digital signals that are compatible with ISDN.

The system 1000 begins operation by receiving at the source terminal 100 an indication from a user that the user wishes to send either a common transmission to multiple of the destination facilities 2A–2N and/or one or more subchannel messages. The common transmission is sent on separate subchannels to the destination facilities 2A–2N, while the subchannel messages are sent to one or more of the destination facilities 2A–2N. Moreover, the user of the source facilities 101, indicates, or has the option to indicate, how the user would like to allocate the available 128 kbps, which in the preferred embodiments is subdividable into 1 kbps sections, although other smaller or larger increments may be provided as well. Optionally, the source terminal will not query the user, but will automatically recognize whether the user inputs multiple telephone numbers (e.g., addresses, or other identifiers for the respective destination facilities 2A–2N) and automatically determine the greatest available channel capacity for communicating the information to the target destination facilities 2A–2N. In response, the multi-addressing mechanism 102 cooperates with the bandwidth allocation mechanism 5104, and perhaps the data rate expansion mechanism 5102 if more than 64 kbps are required, so as to form the setup message in memory. The source terminal 100 after forming a setup message, sends the setup message through the terminal adapter 10A, NT1 14 and to the ISDN switch 220 via the single link 15.

In response to receiving the setup message, the ISDN switch 220 passes the message to the processor 24 by way of the bus 27. In the processor 24, the 1×N extension mechanism 106 identifies if multiple addresses are contained in the setup message, or alternatively recognizes a flag that indicates that the source terminal would like to send a message to multiple destination terminals. If a 1×N extension message is present, the 1×N extension mechanism 106 stores an indication of the multi-address request in RAM, and initiates an initial investigation as to whether the respective destination facilities 2A–2N have available to them open channels (for example one of the 2B channels), or subchannels for receiving the 1×N extension message from the source terminal.

The 1×N extension mechanism 106 coordinates with the channel and bandwidth coordination mechanism 5106, which serves to subdivide the available 128 kbps associated with the 2B channels, for communicating with the respective destination facilities 2A–2N, as identified by the source terminal 100 in the setup message. The channel and bandwidth coordination mechanism 5106 initiates the investigation by sending to the respective switch modules 28A–28N, a command to issue a query to the respective destination facilities 2A–2N so as to determine whether respective destination facilities 2A–2N have available the requested capacity on at least a portion of one of the B channels for receiving the data message (such as a facsimile image) from the source terminal 100. Alternatively, the channel and bandwidth coordination mechanism 5106 monitors the communication with the respective destination facilities 2A–2N so as to determine whether the respective destination facilities 2A–2N have available to them the requested channel capacity. Alternatively, higher data rates may be achieved by combining 2B channels for respective of the destination facilities 2A–2N as coordinated by the 1×N extension mechanism 106, so that higher data rates may be supported for those facilities.

When the multi-addressing mechanism 102 of the source terminal 100 generates a 1×N extension message, the 1×N extension mechanism 106 polls the respective switching modules 28A–28N, on a periodic basis, e.g., 210 milliseconds, for a total time period of up to 5 seconds, for example, so as to determine which of the respective destination facilities 2A–2N have a communication path available for receiving the data message from the source terminal 100. Based on the polling responses, the 1×N extension mechanism 106 communicates a status message via the bus 27 and switching module 26 to the source facilities 101, and informs the source terminal 100 that one or more of the destination facilities 2A–2N are ready and available to receive the data message. In response, the source terminal 100 transmits the message via the processor 24 into the respective switching modules 28A–28N, in correspondence with the available destination facilities 2A–2N. If the links 17A–17N to the destination facilities 2A–2N have a common bandwidth (e.g., 1 kbps), the processor 24 allows the source terminal 100 to route the message to each of the destination facilities 2A–2N at a common rate. However, consistent with the operation of the channel and bandwidth coordination mechanism 5106, the processor may also determine that one or more of the destination facilities 2A–2N can only support a limited data rate, or the source terminal 100 may have originally requested that a different data rate be used for a particular one of the destination facilities. In either case, the processor 24 implements a store and forward option, where information of the message sent from the source terminal 100 is buffered in the 1×N extension mechanism 106 so that the slowest of the destination facilities 2A–2N may receive information from the processor at the maximum rate it can handle, or the rate of the subchannel requested by the source terminal 100, and assigned by the switch 220. The switches 28A–28N themselves may serve as store and forward hubs so that coordination with the 1×N extension mechanism is kept to a minimum. Of the other available destination facilities 2A–2N that either have a higher communication capacity, or had been designated to use a subchannel with a higher data rate capability, switching modules 28a–28n may extract copies of the message from the processor 24 at a rate commensurate with the channel capacity of the communication link that interconnects the respective destination facilities 2A–2N with the ISDN switch 220.

Alternatively, the source terminal 100 may serve as a repository for the data message until the 1×N extension mechanism 106 and the channel and bandwidth coordination mechanism 5106 have determined that at least a subset of the destination facilities 2A–2N are available for receiving the data message. Once informed, the source terminal 100 sends the data message over one or more B channels, or even a subchannel, so that the 1×N extension mechanism 106 places the message on the bus 27 and routes the message to the relevant switching modules 28A–28N. The switching modules 28A–28N then send a copy of the message to the available destination facilities 2A–2N on subchannels assigned by the channel and bandwidth coordination mechanism 5106.

While the communication of the data message (which itself may be a 1×N extension message, or another message such as a digital audio or digital video file), over the one or more subchannels is normally performed over one or more B channels, or subchannels thereof, the coordination process between the switch 220 and the respective destination facilities 2A–2N is performed on D channels available to the respective destination facilities 2A–2N. The D channel used for establishing initiating the subchannelization, however, is provided to the source terminal 100, and thus only on D channel is used between the source terminal 100 and the switch 220.

Figure 6:
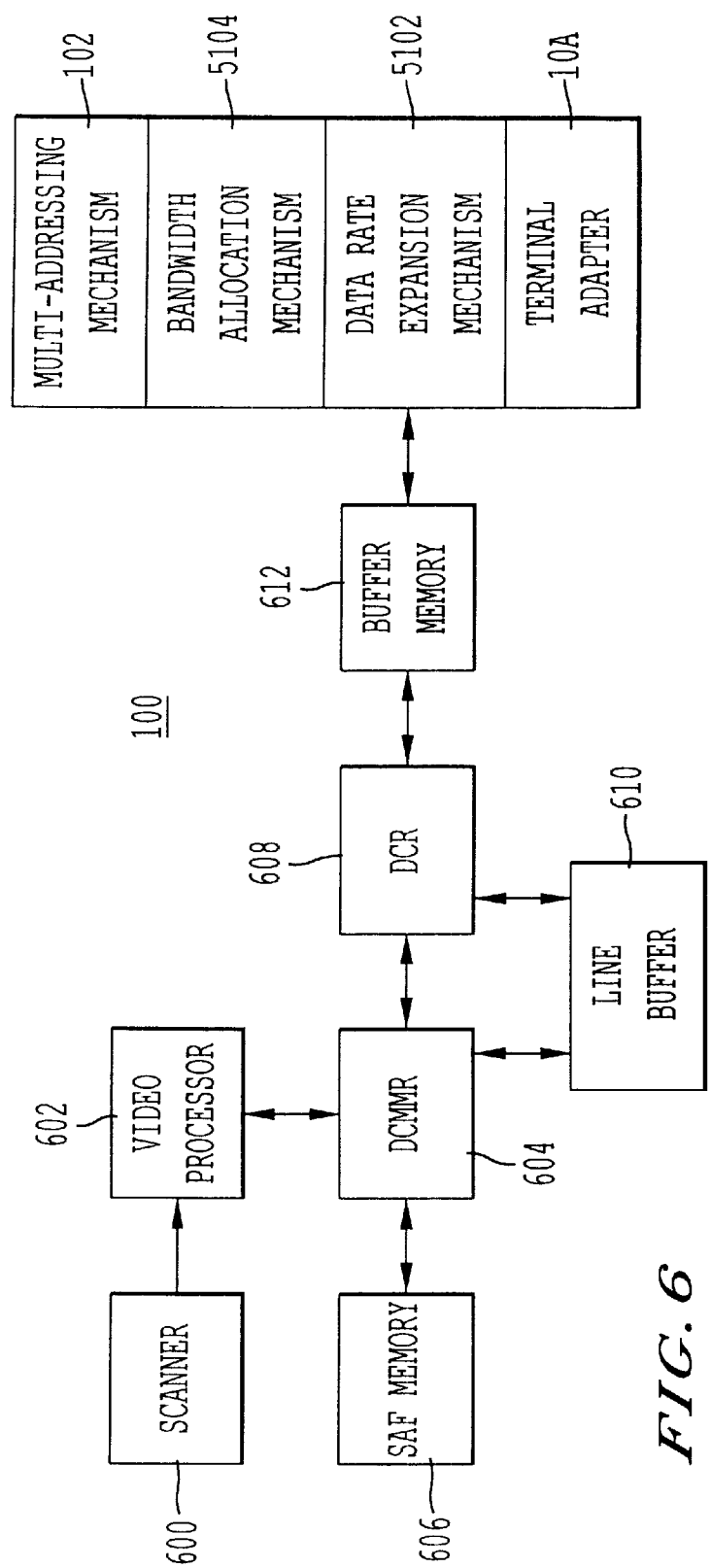
FIG. 6 is a block diagram of the signal processing mechanisms and selected components in a source, or destination, terminal according to the present invention.

FIG. 6 is a block diagram showing several major signal processing features of the source terminal 100. As one preferred embodiment is directed to a facsimile machine, a scanner 600 is included, which scans an original document and produces a digital output provided to a video processor 602. The scanning processor is initiated by an operator inputting an ISDN number and pressing a start button on a keypad (as will be discussed with respect to FIG. 9) to initiate the dialing procedure and initiate the scanning process at the same time. The video processor 602 receives and frames the data for possible manipulation by the operator if so desired. Otherwise, the frame data is then passed to a data compression modified read (DCMMR) mechanism 604, implemented in software, executed by a processor (not shown). The DCMMR reduces redundancy in the video information so as to provide for more efficient use of the communication channels or subchannels. Alternatively, previously scanned data or other data, stored in a stored and forward (SAF) memory 606 is input to the DCMMR 604 for transmission to the respective destination facilities 2A–2N. In the receive mode of operation, the data compression ratio register (DCR) 608, uses a line buffer 610 as needed to receive the compressed data for ultimate compression by the DCMMR 604. Again on the receive side, the DCMMR, after decompressing the received video data, passes the video data to the video processor 602, which formats the decompressed video data into output data for display on a display device or for printing on a printer. When printed to a printer, the output signals are sent to a laser power controller (LPC) that controls a laser diode driver (LDDR), not shown. The buffer memory 612 holds the compressed video information for use by the data rate expansion mechanism 5102, bandwidth allocation mechanism 5104, and multi-addressing mechanism 102. These respective mechanisms include a processor (such as a central processing unit, distributed processors, or a digital signal processor) so as to implement a serial communication controller (SCC) for handling and subdividing, if necessary, both the B1 and B2 channels. More particularly, in addition to handling the data rate expansion coordination with the ISDN switch 220, the data rate expansion mechanism 5102 also formats the data into an ISDN frame for transmission to the ISDN switch, where the data is formatted in identifiable subchannel allocations, for distribution at respective allocation data rates to the addresses of the destination terminals identified by the multi-addressing mechanism 102. Moreover, the data rate expansion mechanism 5102 formats 32 bits of contiguous data into one ISDN frame (see, e.g., FIG. 2) such that the 32 bits of B1 and B2 data are sent in one frame at a rate of 128 kbps. However, some of the bits in the frame are allocated to respective subchannels, such that the respective data rates of the subchannels are adjusted according to the number of bits allocated per frame for the respective subchannels. For example, a subchannel that receives only one kbps, receives one data bit per four frames. On the other hand, a subchannel that signals at 128 kbps, receives all the data bits for a given frame. For intermediate data rates (e.g., integer multiples of 1 kbps up to 128 kbps) use partitioning of the 32 bit frames as needed. The serial communication control implemented in the data rate expansion mechanism 102, sequentially fills the 32 bits of data in respective of the ISDN frames and sends the frames, until all the data has been transmitted.

Because the ISDN switch 220 recognizes that the source terminal 100 is communicating with one or more of the destination terminals over, perhaps, both B channels, the ISDN switch 220 handles the data contained in the B2 portion of the ISDN frame as being data that is no different than data contained in the B1 portion of the frame. In each case, data contained in both the B2 and the B1 portion, are subdivided according to mutual agreement between the bandwidth allocation mechanism 5104 and the switch 220, where the bandwidth allocation mechanism 5104 informs the switch 220 of the respective locations of bits for respective subchannels, in the respective portion of the B1 and B2 frames. When a composite B channel (128 kbps) signal is sent, the ISDN switch 220 sends the entire ISDN frame to the destination terminal 160, where the destination terminal 160 performs an inverse process to that performed at the source terminal 100, so as to receive the transmitted information. More particularly, in this example, the destination terminal 160 employs a data rate expansion mechanism 5102 that extracts the B1 and B2 portions of the information from the respective frames, extracts the respective data, and provides the data to the buffer memory 612 for decompression by the DCMMR 604, with the assistance of a line buffer 610 and an SAF memory 606, for storage on an as needed basis. Ultimately, the data, which may be video data for example, may be displayed and/or printed. This operation is performed similarly at the destination terminals if the data rate is less than 128 kbps.

Alternatively, the serial communication controller implemented in the data rate expansion mechanism 5102, may implement two separate serial controllers, one dedicated for filling the respective B1 channel portions of the respective ISDN frames, and the other filling the B2 portions of the respective ISDN frames. The destination terminal respective portions of the B1 channel portions and B2 channel portions may further be subdivided for data rates of the subchannels being less than 64 kbps. The destination terminal 160, will then employ a reverse process, where the data rate expansion mechanism 5102 will employ a first and second serial communication controller to extract the respective portions associated with the B1 and B2 channels for each of the respective ISDN frames. The data will then be buffered, decompressed, processed as necessary with the video processor and printed or displayed. The data rate expansion mechanism 5102 includes a CPU, RAM, ROM and optionally an application specific integrated circuit, all of which are available in the source terminal 100. The bandwidth allocation mechanism 5104 and multi-addressing mechanism 102 are similarly implemented in the source terminal 100. The respective mechanisms themselves are primarily performed in software, although hardware equivalents such as that which may be performed with an application specific integrated circuit or programmable logic device are also applicable.

Figure 7:
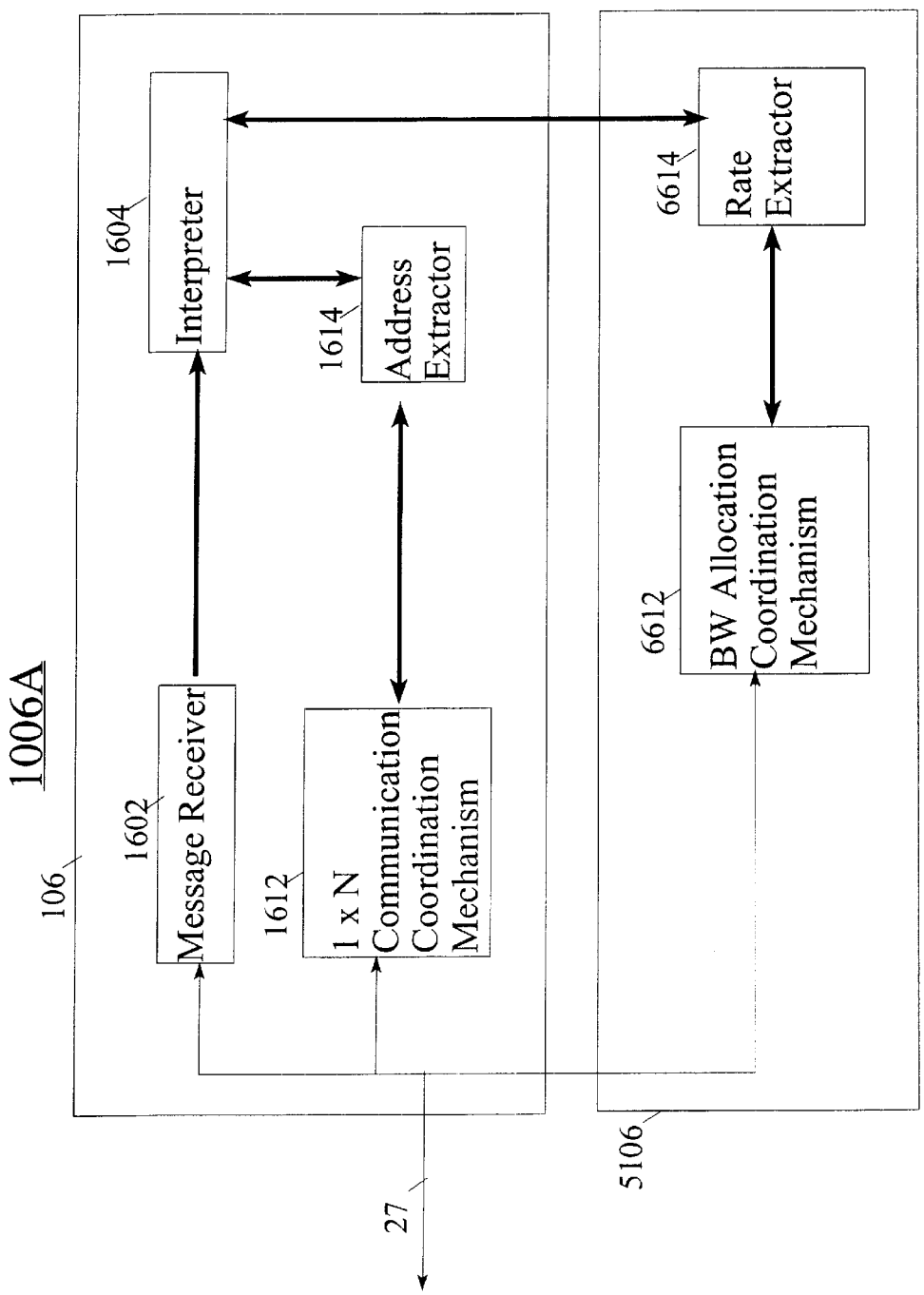
FIG. 7 is a block diagram of components included in a processor of the digital network switch according to the present invention.

FIG. 7 is a block diagram showing several mechanisms included in the processor 24 and memory of the switch 220. In particular, the 1×N extension mechanism 106 is shown as including a message receiver 1602, interpreter 1604, address extractor 1614, and 1×N communication coordination mechanism 1612. The channel and bandwidth coordination mechanism 5106 is shown to cooperate with the message receiver 1602 and interpreter 1604, but specifically includes rate extractor 6614, and bandwidth allocation coordination mechanism 6612, as shown. The message receiver 1602 receives the 1×N extension message (or other data message or messages) from the source terminal 100 and stores the same in memory. The receiver 1602 also receives the channel and bandwidth coordination information on the D channel contained in the setup message and stores the same in memory. The message receiver then passes both the 1×N coordination message portion of the message as well as the bandwidth coordination message to the interpreter 1604. (The 1×N coordination message and bandwidth coordination message may be included in a common message, i.e., a joint message). The interpreter 1604 determines the number of destination facilities requested by the source terminal 100 and informs the address extractor 1614 of the number of destination facilities targeted to receive the message or messages. The interpreter 1604 also extracts data rate information to be provided to the rate extractor 6614 which identifies a particular subchannel data rate corresponding to respective destination addresses as identified by the address extractor 1614.

The address extractor 1614 extracts a particular address (such as a telephone number) for each of the destination facilities recognized by the interpreter 1604. Once each of the addresses is extracted by the address extractor 1614, the address extractor 1614 provides the addresses to the 1×N extension mechanism 106. The rate extractor 6614 extracts the rates for the respective destination terminals (i.e., separate subchannels for the respective destination terminals), and provides the same to the bandwidth allocation coordination mechanism 6612, which associates the respective requested rates with the 1×N communication coordination mechanism 1612. Subsequently, the 1×N extension mechanism 106 sends respective query messages to the switching modules 28A–28N that correspond with the respective destination facilities identified by the addresses extracted by the address extractor 1614. These corresponding switching modules 28A–28N format and send the query requests to the respective destination facilities 2A–2N, inquiring whether the respective destination facilities 2A–2N have communication links, with sufficient residual capacity, available for receiving the data message at rate requested by the source terminal 100. The respective destination facilities 2A–2N respond when a link is available, and confirm that the capacity requested is, or is not, available.

After a predetermined period of time, such as 10 millisecond time intervals, the 1×N communication coordination mechanism 1612 polls respective of the switching modules 28A–28N over the bus 27 regarding the status of the destination facilities 2A–2N. If after a predetermined number of polling intervals, such as 500, not all the switching modules 28A–28N have indicated that a communication link is available, the 1×N extension mechanism 106 notes in memory those destination facilities for which the message could not be routed at this time, and informs the source terminal 100 in the status message. Furthermore, if the communication could not be performed at the desired rate, the source terminal 100 is informed in the status message of the highest available subchannel data rate supportable for communicating with the destination terminal such that the source terminal 100 may alter the subchannel data rate request, or an automatic conversion to the highest available data rate is used. The status message includes the addresses of the destination facilities that did not receive the message and reports the same via the bus 27 through the switching modules 26 to the source facility 101. In this way, the source terminal 100 is informed that the message has only been partially sent.

In the store and forward alternative embodiment, the processor 24 sends the data message to the available destination terminals 2A–2N. In another alternative, the source terminal sends the data message to the switch 220 after receiving the status message so the switch 220 can relay the data message to the available destination facilities 2A–2N. Optionally, the 1×N communication coordination mechanism 1612 waits for a predetermined amount of time, such as 10 minutes, and then reestablishes the process for routing the message to those destination terminals 2A–2N that were not previously available to receive the data message. This periodic checking continues for a predetermined number of intervals (e.g., 20) before the process terminals, and the 1×N communication coordination mechanism 1612 informs the source terminal 100 that the message was not and will not be delivered to the subset of intended destination facilities. At this point, the source terminal 100 optionally includes an automated link reestablishment procedure that automatically contacts the switch 220 after a predetermined period of time and provides the switch 220 with another 1×N extension message and bandwidth allocation message that identify the addresses of the destination facilities 2A–2N that were previously unavailable. Then the process repeats itself.

Figure 8:
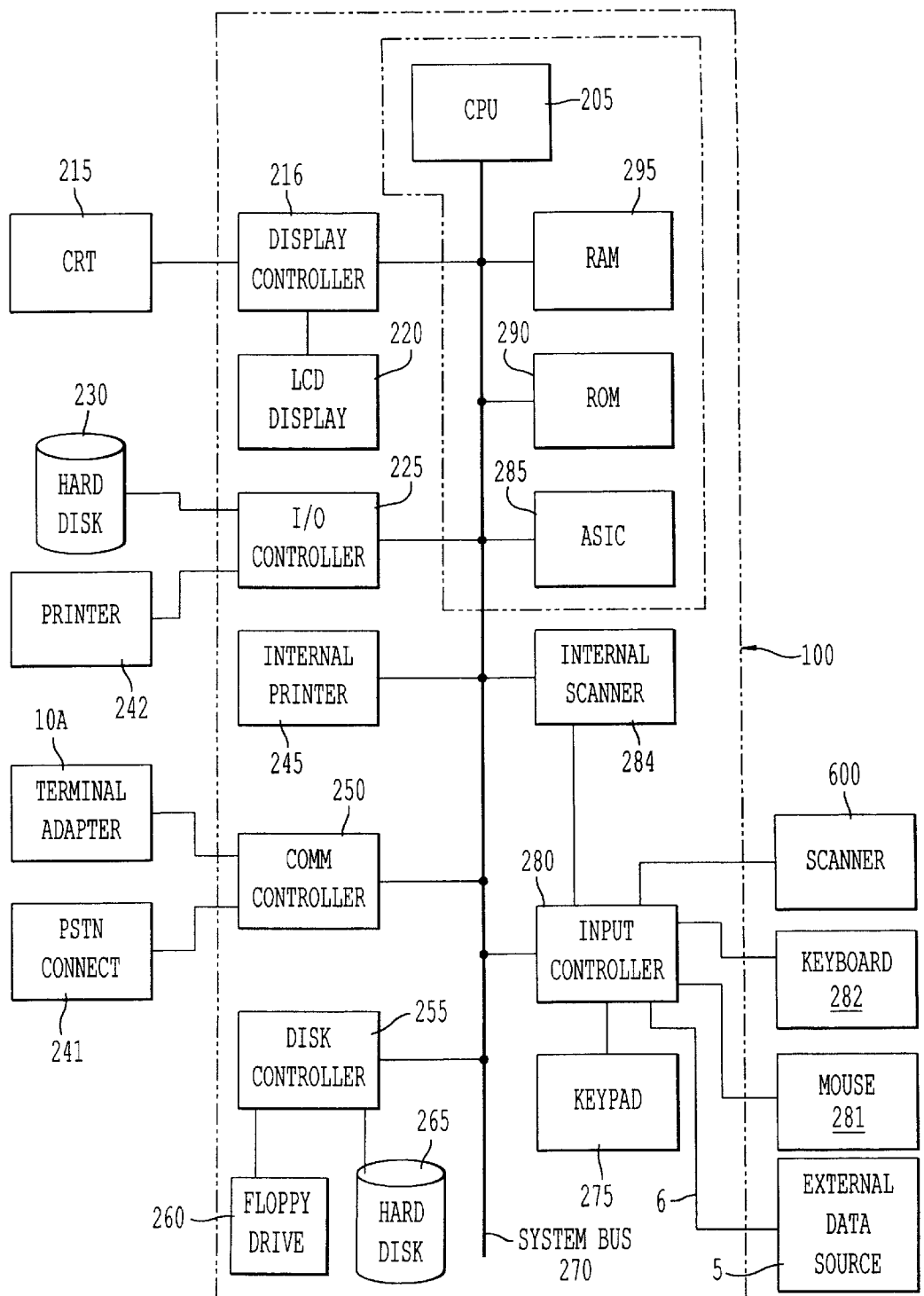
FIG. 8 is a block diagram of components included in a source terminal or destination terminal.

FIG. 8 is a block diagram of an exemplary source terminal 100 according to the present invention. The terminals in the destination facilities 2A to 2N and the processor 24 in the 1×N switch 220 include similar components to that shown in FIG. 8. The source terminal 100 is connected to the terminal adapter 10A, which may be included internally or externally, and the terminal adapter 10A may also include brouter functions. The source terminal also connects to a PSTN connection 241, so that conventional communications may be sent over analog lines, if necessary. An external data source connection 5 is shown to connect to the source terminal 100 via an external interface 6, where the external data source 5 provides digital data or analog data (which is then digitized by the source terminal 100 with an analog to digital converter contained therein) to the source terminal 100 for inclusion in 1×N extension message sent to the destination facilities 2A to 2N. The external data source may be any type of data source that would benefit from transferring data to a remote location. Examples of external data sources 5 include a printer, digital camcorder, digital camera, digital versatile disk (DVD), digital video (DV) recorder, CD player, digital telephone, computer and a photocopier.

The external interface 6 is a digital bus (e.g., serial or parallel) when the source terminal 100 receives digital data through a respective connector(s) formed therein. In particular, example external interfaces 6 include universal serial bus (USB), EIA-232, ISDN (ISO 8877), or IEEE 1394 ("Firewire") as described in Wickelgren, I., "The Facts About Firewire", IEEE Spectrum, April 1997, vol. 34, No. 4, pp 19–25, the contents of which are incorporated herein by reference. When receiving analog data, the external interface 6 is configured as a coaxial cable, a twisted pair, or an optical fiber (for example) as the source terminal 100 includes a respective connector for receiving the analog signals.

Because the source terminal 100 is configured to receive information from the external data source 5 via the external interface 6, the source terminal 10 provides a conventional facsimile function, albeit with a variable data rate capacity. In particular, the source terminal 10 of FIG. 8 also serves as a general purpose communications resource that is capable of transmitting data at a high data rate from various types of external data sources 5 to remote terminals. In a reciprocal manner, the source terminal 10 is equipped to receive data from another terminal (e.g., destination facility 2A) and provide the data to the external data source 5 for display thereon or for use therein.

The structure of the source terminal 100 as shown in FIG. 8, also suitably describes the general features of the processor 24 that would be employed in the modified ISDN switch 220, although appropriately adapted for an ISDN switch application as will be appreciated by one skilled in the ISDN art. A system bus 270 interconnects a variety of components that populate the system bus 270. A central processing unit (CPU) 205 executes software processes that provide general purpose control of the source terminal 100, multi-address extension mechanism, bandwidth allocation mechanism, and data rate extension mechanism operations as well as bus administration functions for the system bus 270. The CPU 205 has available to it system random access memory (RAM) 295 for temporary storage of data. The non-volatile ROM 290 also holds the control program and fixed parameters. An application specific integrated circuit (ASIC) 295 is provided for performing specialized data manipulation functions, which could be adapted to serve as the entire bandwidth allocation mechanism 5104, although in the present embodiment, most of the bandwidth allocation mechanism 5104 is performed in the CPU 205 by the execution of a bandwidth allocation software-based process. The multi-addressing mechanism 102, bandwidth allocation mechanism 5104 and data rate expansion mechanisms 5102 are implemented in the hardware and software contained in the dash line in FIG. 8 and includes the CPU 205, RAM 295, ROM 290, and ASIC 285. However, because the multi-addressing mechanism 102, bandwidth allocation mechanism 5104 and data rate expansion mechanism 5102 are largely computer-based, a subset of the components shown in FIG. 8 or additional components may be included with the components contained in the dashed line.

As an alternative to the ASIC 285, other data manipulation devices such as field programmable gate arrays (FPGA, not shown), programmable logic devices (PLD, not shown) and other processing units (such as digital signal processing chips, not shown), may also be used. Also available as system resources are a disk controller 25, which controls an internal floppy disk 250 and a hard disk 265, and an input/output (I/O) controller 225, which controls an external hard disk 230 and an external printer 242. Either the external printer 242 or an internal printer 245 may be used to print text and data files output by the source terminal 100.

An input controller 280 is included that controls the internal scanner 600, an optional external scanner 283, an external keyboard 282, an external mouse 281, and an internal keypad 275. Under control of the input controller 280, either the internal scanner 284 or the external scanner 283 may be used to capture an image of an object document and convert the image into a digital data stream that is passed through the input controller 280 to the system bus 270 for further processing. The input controller 280 also receives input from the keypad 275, which serves as a data input device for the source terminal 100, although the keypad 282 and the mouse 281 serve as alternative input devices.

The input controller 280 also provides the interface (at a connector formed thereon) to the external interface 6 which interconnects the external data source 5 to the source terminal 100. For supporting digital signals, the input controller 280 includes interface logic that supports a FireWire interface or another interface standard such as USB, if another interface is used. When analog signals are provided, the input controller 280 includes an analog to digital converter (ADC) and digital to analog converter (DAC) for converting the external signals between the analog and digital domains. Data that is input to the external interface 6 is passed over the system bus 270 and stored in the RAM 295, where the data is later used by the CPU 205 in preparing the setup message.

A display controller 210 is used to control either, or both, of an external cathode ray tube (CRT) display 215 and an internal liquid crystal display (LCD) 220. Other displayed formats would also be suitable, including plasma displays, an active and passive light emitting diode (LED) displays, etc. The displays 215 and 220, in tandem with the keypad 275, the keyboard 282, and the mouse 281, serve a user interface function.

A communications controller 250 also resides on the system bus 270 and connects to the terminal adapter 10A. As discussed previously, the communication controller 250, and outputs information to the terminal adapter 10A according to RS232, V.35 or other data communication arrangement. The connection to the PSTN, is a RJ-11 connection, although other connections are possible such as a second ISDN connection, via another terminal adapter, etc., or a wireless access provider connection, for example.

Figure 9:
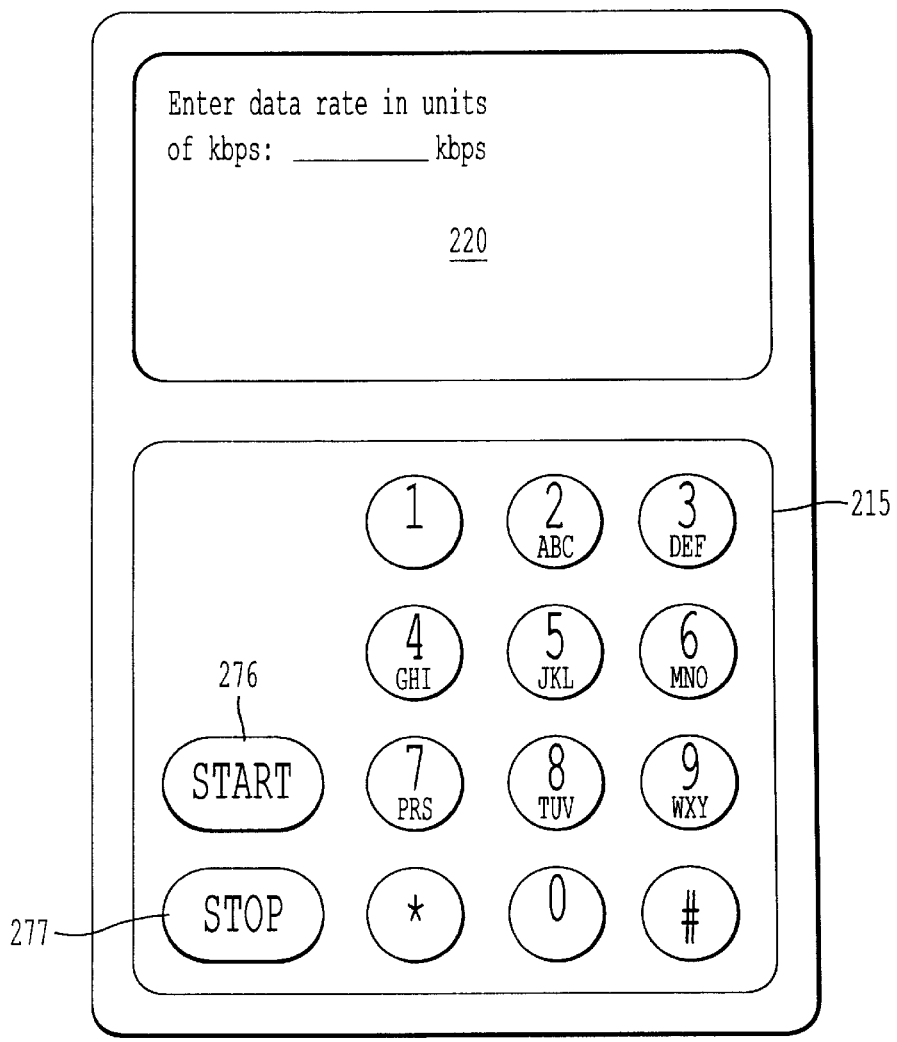
FIG. 9 is a plan view of a display and a keypad of the source terminal of FIG. 5.

FIG. 9 illustrates the display 220 and the keypad 275 of the source terminal 100. The keypad 275 includes a 12-digit numeric keypad, a "start" key 276 and a "stop" key 277. Data that is input by a user on the keyboard 275 is echoed (i.e., displayed) on the display 220 so that the user knows what the user entered at any given time. In addition, the display 220 also includes text, generated by the source terminal 100 that "prompts" the user to enter specific information at a specific time. For example in FIG. 8, the display 220 is prompting the user to enter select a data rate for a subchannel in units of kbps.

Figure 1:
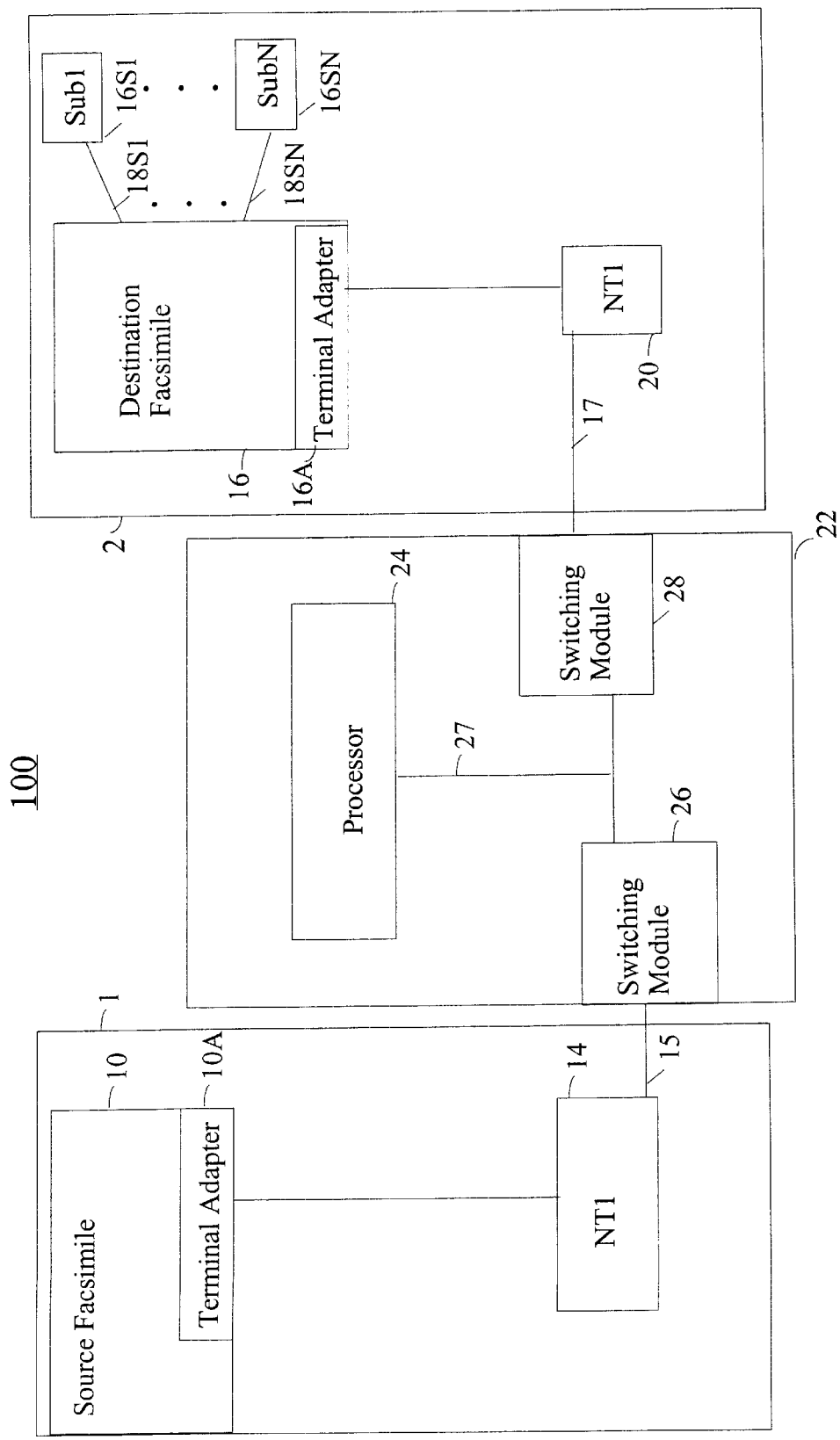
FIG. 1 is a block diagram of a conventional ISDN communication system.
Figure 3:
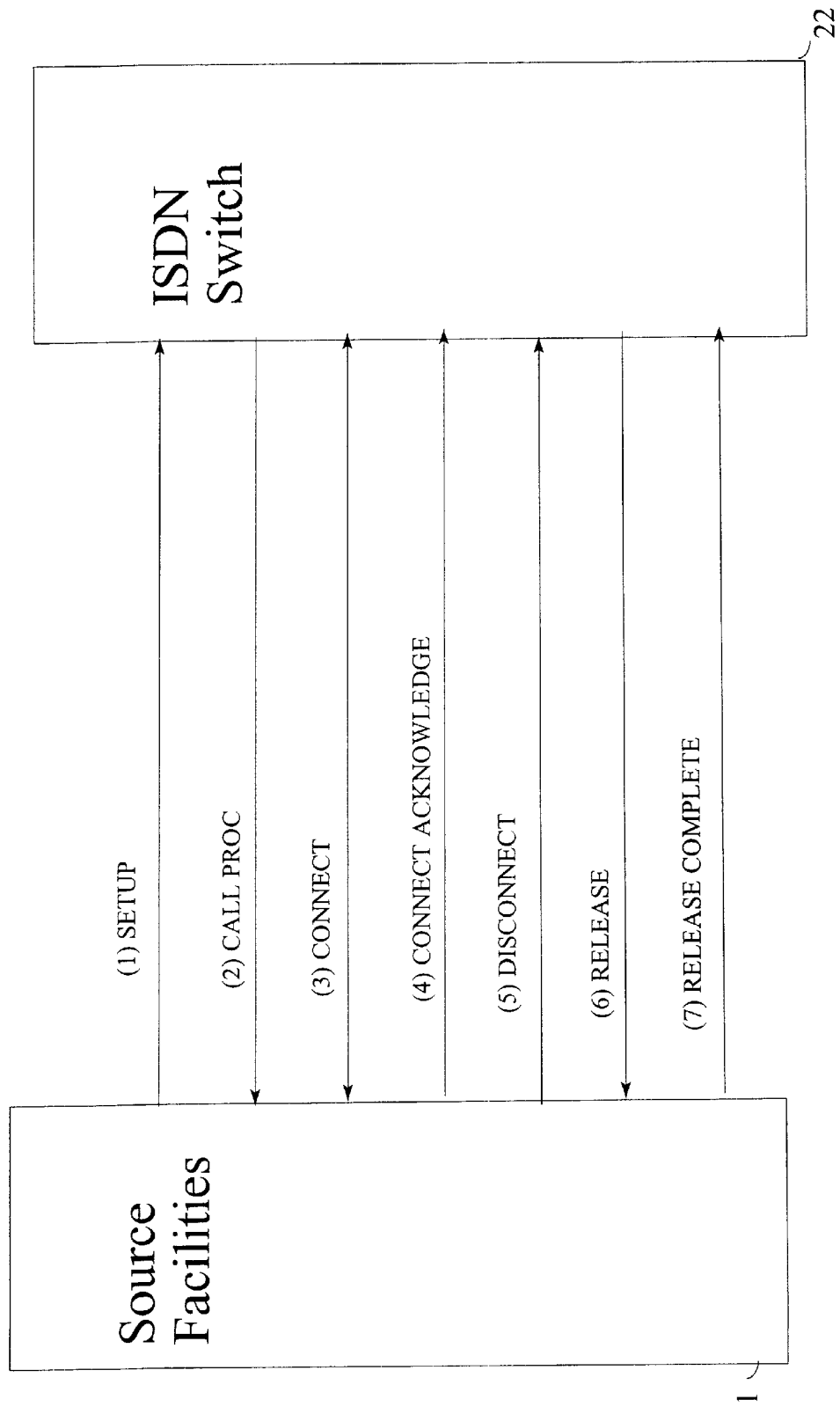
FIG. 3 is a conventional control signaling protocol for ISDN basic services.
Figure 4:
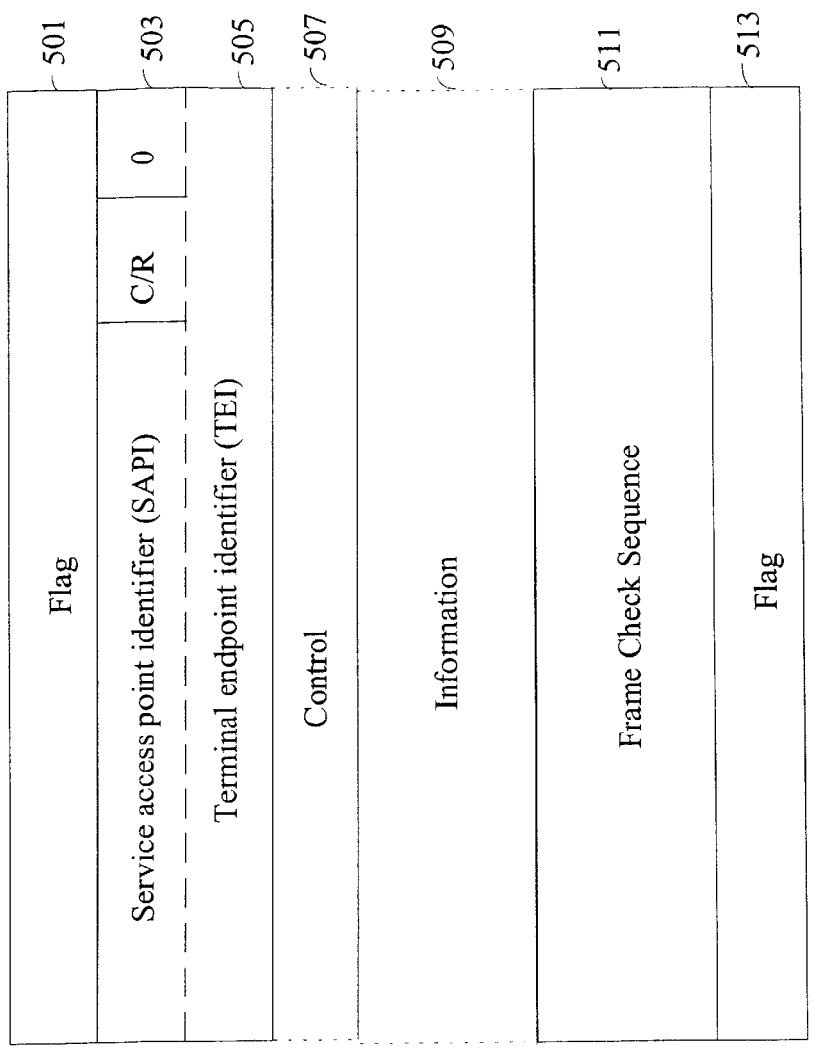
FIG. 4 is a conventional link access protocol D channel message format for a setup message using an I.451/Q.931 message structure.
Figure 10:
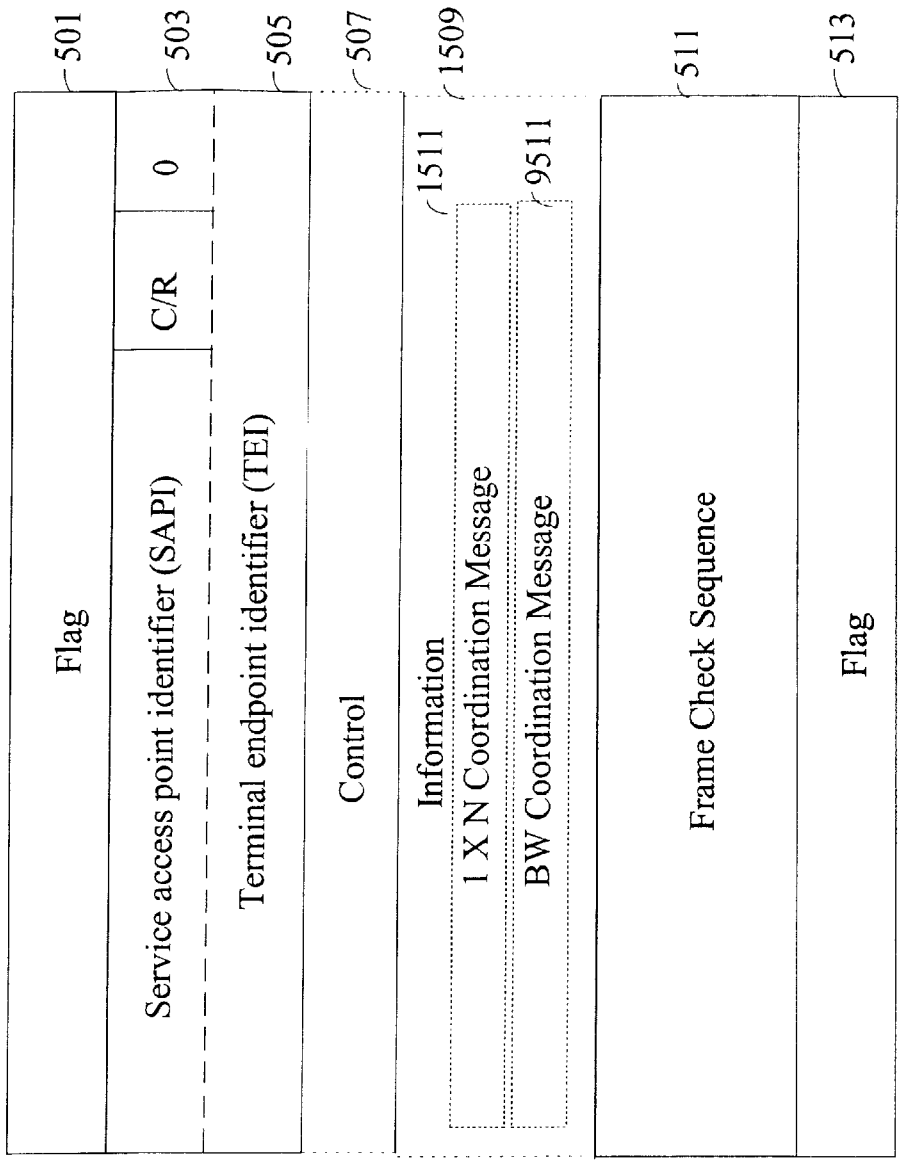
FIG. 10 is a modified link access protocol of the D channel (LAPD) setup message structure incorporating a 1×N coordination message and bandwidth coordination message according to the present invention.

FIG. 10 shows the LAPD frame structure for a setup message that includes a 1×N coordination message 1511 and bandwidth coordination message 9511 that is formed by the source terminal 100, stored in RAM 295, and subsequently sent via the system bus 270 to the terminal adapter 10a and then to the switch 220. A difference from the frame structure of that shown in FIG. 10 from that shown in FIG. 4 is that the information frame 1509 of FIG. 10 includes the 1×N coordination message 1511 and the bandwidth coordination message 9511 (shown as separate messages, although a joint message may be used as well). Each of the 1×N coordination message 1511 and bandwidth coordination message 9511 include respective indicator fields having values indicative of the operator's response to the prompt of whether the message is sent to multiple locations and the respective data rates for each location. The indicator itself may simply be the message, such that no additional characters are required. When the setup message is sent to the switch 220, the processor 24 in the switch 220 then detects the presence of the respective values included in the indicator fields. If the 1×N coordination message indicator is detected, the processor 24 then extracts the respective addresses added at the source facilities 101 so as to determine which of the destination facilities 2A–2N are target recipients of the data message. Similarly, if the bandwidth coordination message indicator is identified, the processor extracts the requested subchannel data rates for the respective destinations. The process for handling the 1×N coordination message and bandwidth coordination message were previously discussed with respect to FIG. 7.

Figure 11:
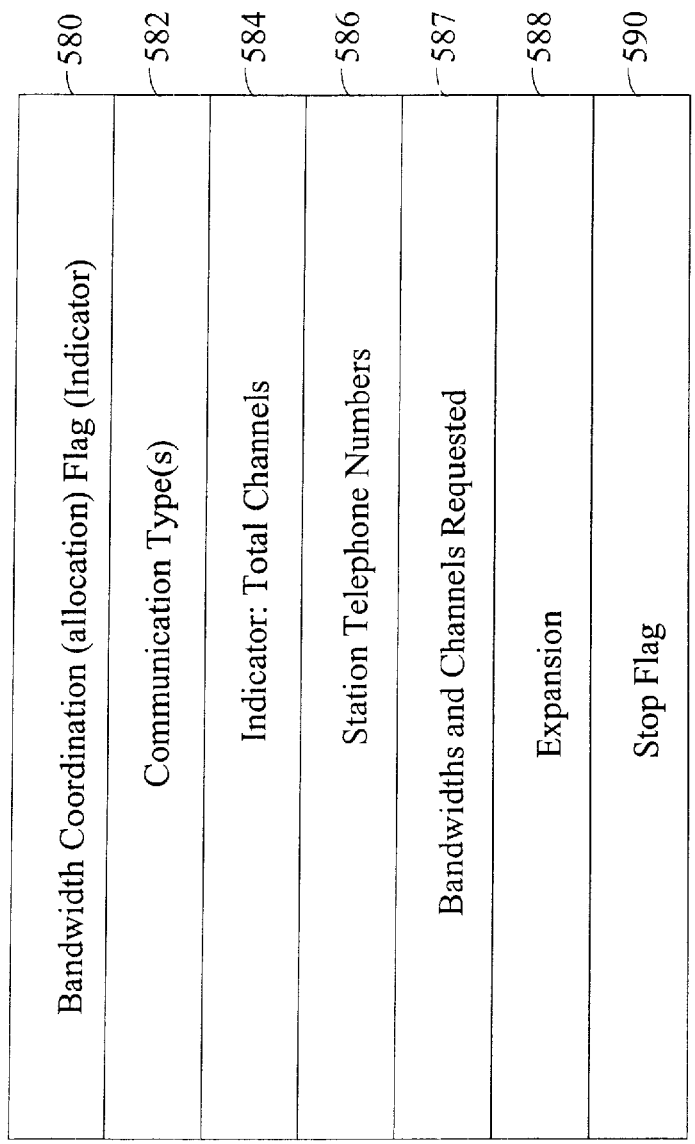
FIG. 11 is a block diagram of a bandwidth coordination message.

FIG. 11 shows exemplary frames for the bandwidth coordination message 9511.

The structure of the 1×N expansion message was previously explained in co-pending, commonly owned patent application, entitled "Method and Apparatus for Sending a 1×N Communication Message". Reply messages from respective destination facilities 2A–2N are similarly structured. A bandwidth coordination flag is a first frame 580, which identifies a specific code identifier (such as a string of pound-sign symbols) associated with sending a bandwidth coordination message. Following the first frame 580, is a "communication type" frame 582, which indicates the type of message protocol being used by the source terminal 1. The message protocol indicator is employed by the switch for the digital network of open bandwidth embodiment, where the switch also performs a protocol conversion between the source terminal 100 and the respective destination facilities 2A–2N.

The indicator field 584 is provided to indicate the total number of addressees (i.e., identifications of destination facilities included in the bandwidth coordination message. In field 586, the individual station telephone numbers (or addresses, more generally) are included and delineated by predetermined characters such as a pound sign or asterisk. Field 587 identifies respective bandwidths (i.e., data rates for respective subchannels) for the respective subchannels requested for the communicating with the destination terminals. Expansion field 588 is included for future capabilities and the stop flag 590 indicates an end of the bandwidth coordination message.

Figure 12:
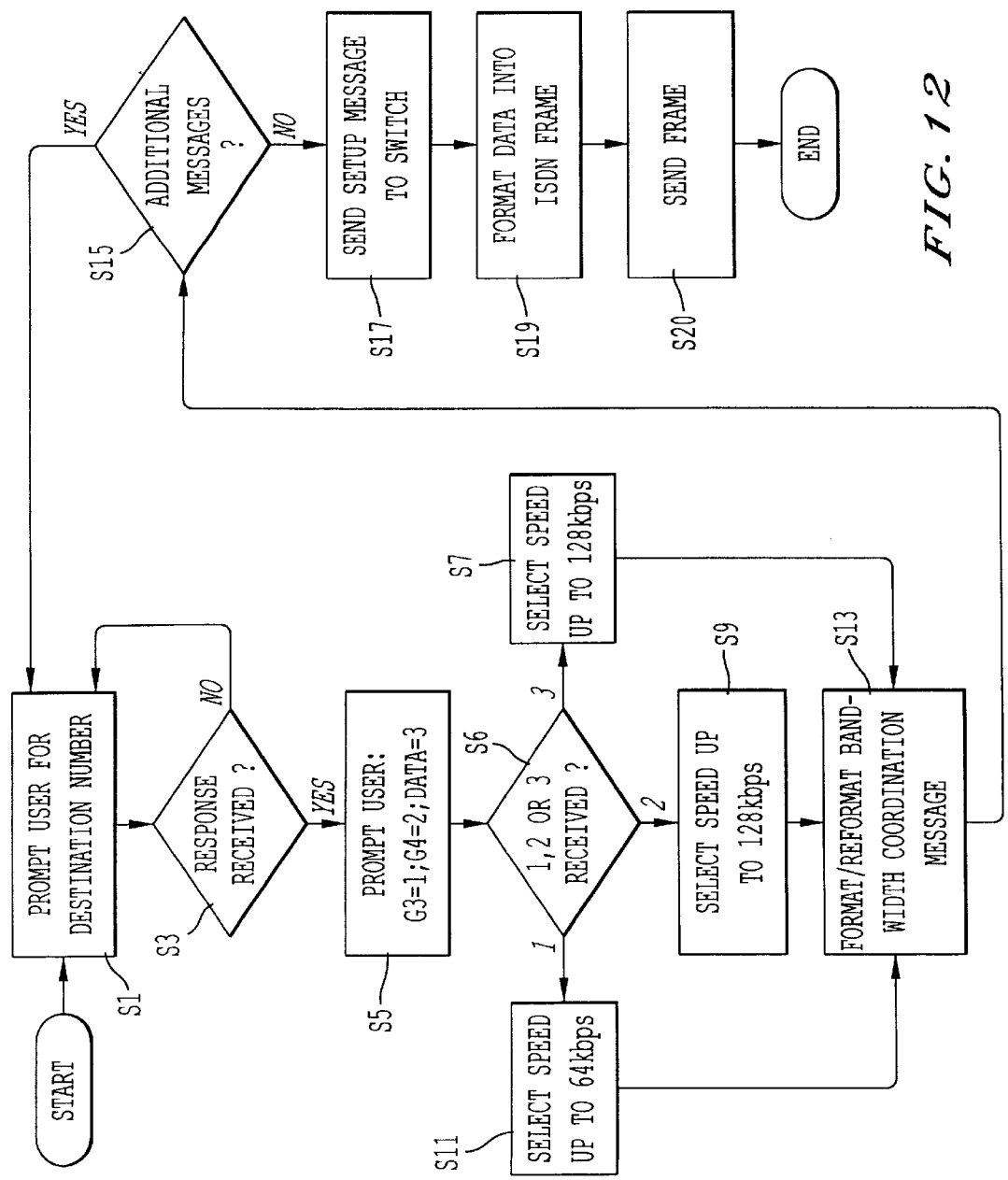
FIG. 12 is a flowchart of a method for initiating a subchannelization communication session according to the present invention.

FIG. 12 is a flowchart of a process implemented at the source terminal for preparing and sending the bandwidth coordination message, which may also include the 1×N extension message when used. The process begins in step S1, where the user is prompted to input a destination number. The process proceeds to step S3, where an inquiry is made regarding whether a response is received in step S1. If the response to the inquiry in step S3 is negative, the process returns to step S1. However, if the response to the inquiry in step S3 is affirmative, the process proceeds to step S5. In step S5 the user is prompted to indicate the type of message to be sent. If the user wishes to send a G3 facsimile message the user enters 1. If the user wishes to enter a G4 transmission, the user enters a 2. If the user wishes to send simply data, such as video image data, the user inputs a 3. The process then proceeds to step S6, where an inquiry is made regarding whether a "1", "2", or "3" was received. If a 1 is received in step S6, the process proceeds to step S11, where a speed is selected by the user for up to 64 kbps. The speed selections may be made in 1 kbps increments, although as an alternative, smaller increments may be selected as well. If the response to the inquiry in step S6 is a 2, the process proceeds to step S9 where the user selects a speed up to 128 kbps. Similarly, if a 3 is received in response to the inquiry in step S6, the process proceeds to step S7 where the user selects a speed up to 128 kbps. At the conclusion of steps S11, S9, and S7, the process proceeds to step S13, where the bandwidth coordination message is initially formatted and includes an indication that a particular bandwidth has been selected for a particular subchannel, and indicating the data rate for that subchannel.

After step S13, the process proceeds to the inquiry in step S15, where additional messages are checked. If the response to the inquiry in step S15 is affirmative, the process returns to step S1 where additional numbers are entered and then the process proceeds through step S13, where the bandwidth coordination message is reformatted to reflect the additional numbers and associated data rates. However, if the response to the inquiry in step S15 is negative, the process proceeds to step S17 where the setup message, including the bandwidth coordination message and possibly the 1×N coordination message, is sent to the ISDN switch. The process then proceeds to step S19, where the data is formatted into ISDN frames and subsequently sent in step S20 so that the message may be forwarded to the destination terminals at the identified data rates (subchannels).

Figure 13:
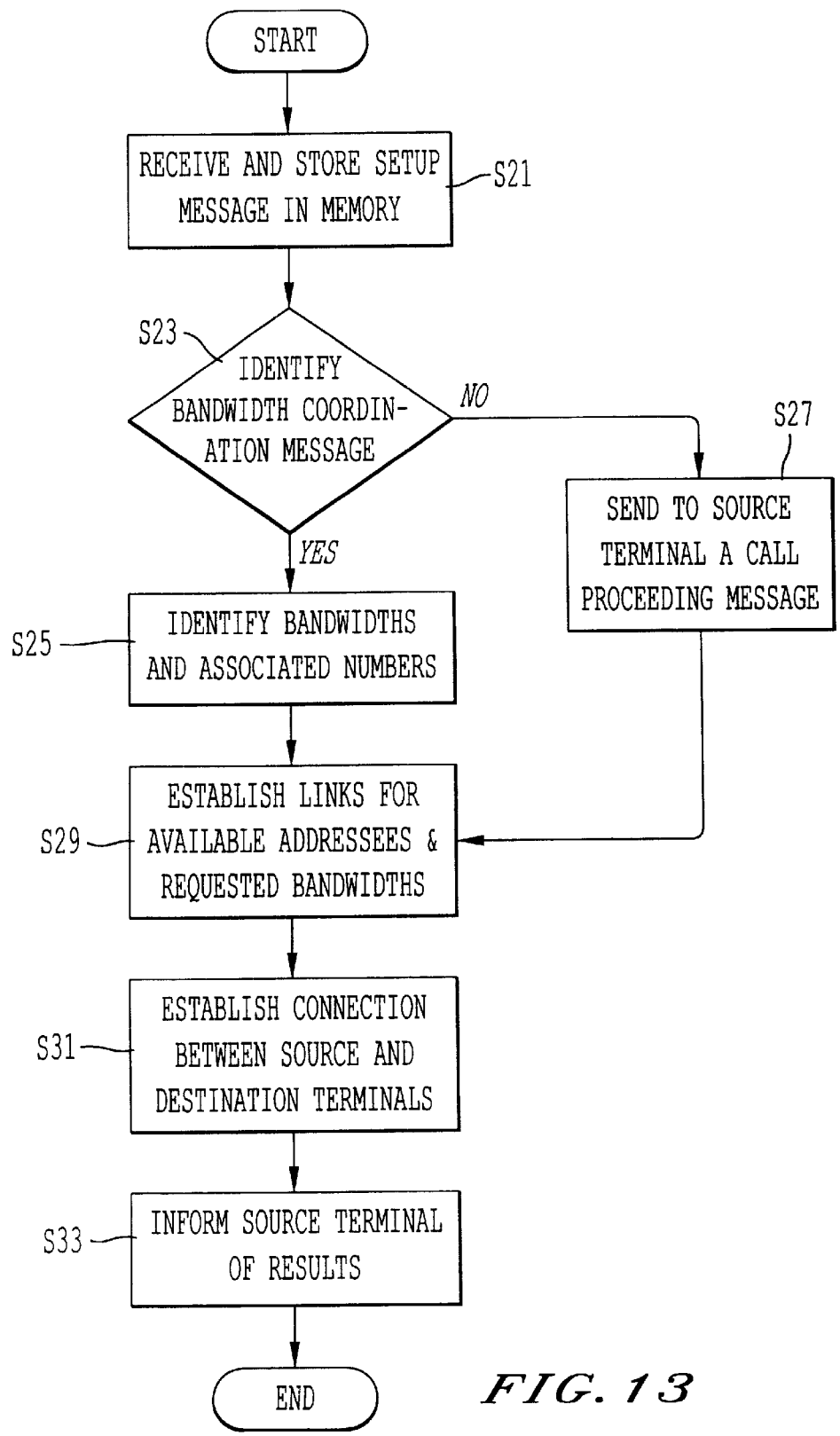
FIG. 13 is a flowchart of a process implemented in the modified ISDN switch for identifying and coordinating the subchannelization features of the present invention as initiated by the source terminal.

FIG. 13 is a flowchart of a process employed at the switch for handling the bandwidth coordination message. The process for handling the 1×N coordination message was discussed in copending application entitled "METHOD AND APPARATUS FOR SENDING A 1×N COMMUNICATION MESSAGE". The process begins in step S21, where the setup message is received and stored in memory. The process then proceeds to step S23, where the presence of the bandwidth coordination message is identified. If the response to the inquiry in step S23 is negative, the process proceeds to step S25 where a message is sent to the source terminal, indicating that the call is proceeding, because only a single call is being made at a predetermined data rate (64 kbps). Subsequently the process proceeds to step S31 as will be explained. However, if the response to the inquiry in step S23 is affirmative, the process proceeds to step S27 where the respective bandwidths and identification numbers of the destination terminals are identified and associated. Subsequently, the process proceeds to step S29 where respective subchannels are established at the requested data rates. The process then proceeds to step S31, where connections are established between the source terminal and the respective destination terminals at the requested data rates. The process then proceeds to step S33, where the switch informs the source terminal of the results of the communication. If the message was not delivered to the destination terminals, then the source terminal may resend a message to the switch indicating that the switch should either wait for the destination terminal to become available at the requested communication rate before sending the message, or sending the message at the greatest data rate made available by the destination terminal. Subsequently the process ends.

The mechanisms and processes set forth in the present description may be implemented using conventional general purpose microprocessors programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An apparatus in a digital network computer-based system, comprising:
    a source terminal, having,
        a source processor,
        a source memory accessible to the source processor, said source memory configured to hold a source terminal program that when executed by the source processor forms a setup message having a bandwidth coordination message contained therein, said source memory being configured to hold in said bandwidth coordination message,
        a bandwidth allocation indicator,
        an address of a destination terminal to which said source terminal will send a data message via a subchannel, and a subchannel data rate for said subchannel;
a source terminal interface configured to be coupled to a digital network switch, said digital network switch having a bandwidth coordination mechanism that dynamically subdivides a capacity of a communication channel into multiple subchannels based on said bandwidth coordination message, said multiple subchannels including the subchannel that will be used for transmitting the data message, wherein
said bandwidth coordination message informs the digital network switch of the subchannel data rate so that the digital network switch establishes the subchannel.

2. The apparatus of claim 1, wherein:
said source terminal interface being configured to send said bandwidth coordination message to said ISDN switch over an ISDN D channel.

3. An apparatus in a digital network computer-based system, comprising:
a source terminal, having,
a source processor,
a source memory accessible to the source processor, said source memory configured to hold a source terminal program that when executed by the source processor forms a setup message having a bandwidth coordination message contained therein, said source memory being configured to hold in said bandwidth coordination message,
a bandwidth allocation indicator,
an address of a destination terminal to which said source terminal will send a data message via a subchannel, and
a subchannel data rate for said subchannel;
a source terminal interface configured to be coupled to a digital network switch, said digital network switch having a bandwidth coordination mechanism that dynamically subdivides a capacity of a communication channel into multiple subchannels based on said bandwidth coordination message, said multiple subchannels including the subchannel that will be used for transmitting the data message, wherein
said bandwidth coordination message informs the digital network switch of the subchannel data rate so that the digital network switch establishes the subchannel;
an ISDN switch as the digital network switch, comprising,
a first switch interface coupled to said source terminal interface and adapted to receive said setup message with said bandwidth coordination message from said source terminal,
a second switch interface coupled to a destination terminal,
a switch processor, and
a switch memory accessible to said switch processor, said switch memory configured to hold a bandwidth coordination mechanism that when executed by said switch processor identifies the bandwidth allocation indicator in the bandwidth coordination message and forms an inquiry signal that is sent to the destination terminal, and other destination terminals, identified in the setup message via said second switch interface, said processor when executing the bandwidth coordination mechanism being configured to identify whether the multiple subchannels are available for communicating with the destination terminal and said other destination terminals identified in the setup message.

4. The apparatus of claim 3, wherein:
said source memory configured to hold a 1×N extension program that when executed by said source processor forms the setup message with a 1×N extension message, said 1×N extension message identifies the destination terminal and at least one destination terminal from said other destination terminals for receiving the data message;
said ISDN switch further comprises a 1×N extension mechanism that interprets the 1×N extension message and establishes other subchannels through which the data message is sent to said at least one destination terminal from said other destination terminals.

5. The apparatus of claim 4, further comprising:
the destination terminal, comprising,
a destination terminal processor,
a destination terminal memory accessible to said destination terminal processor and configured to hold an availability indicator indicative of whether the destination terminal has available a communication link with a residual data rate capacity that is not less than the data rate of the subchannel, and
a destination terminal interface coupled to said second switch interface and configured to receive said inquiry message therefrom, wherein
said destination terminal processor comprises a response mechanism configured to send a reply message to said ISDN switch in response to said inquiry message, said reply message containing said availability indicator value.

6. The apparatus of claim 4, wherein:
said 1×N extension mechanism and said bandwidth coordination mechanism cooperate to adaptably change from a composite ISDN B channel to at least one of a first ISDN B channel and a second ISDN B channel in response to an allocate change request message produced by at least one of said source terminal and said destination terminal.

7. An apparatus in a digital network computer-based system, comprising:
a digital network switch comprising,
a first switch interface coupled to a source terminal and configured to receive a setup message from the source terminal containing a bandwidth coordination, said bandwidth coordination message including a bandwidth allocation indicator and respective data rates for subchannels used to send a data message to multiple destination terminals,
a second switch interface coupled to the multiple destination terminals,
a switch processor, and
a switch memory accessible to said switch processor, said switch memory configured to hold a bandwidth coordination mechanism program that when executed by said switch processor identifies a presence of the bandwidth allocation indicator in the bandwidth coordination message, and if present, determines if respective of the destination terminals have sufficient unused communications capacity available to support establishing the subchannels at the data rates specified in the setup message.

8. The apparatus of claim 7, wherein:
said digital network switch being an ISDN digital switch, and said first switch interface being configured to receive said bandwidth coordination message over an ISDN D channel.

9. A device in a modified integrated services digital network computer-based system, comprising:

an ISDN switch comprising,
a first switch interface means for receiving an ISDN setup message containing a bandwidth coordination message from a source terminal, said bandwidth coordination message including a bandwidth allocation indicator and data rates for subchannels to be used in sending a data message to multiple destination terminals,
a second switch interface means for interfacing said source terminal with the multiple destination terminals via the subchannels,
a switch processor having,
means for holding a bandwidth coordination mechanism program that when executed by said switch processor identifies a presence of the bandwidth allocation indicator in the bandwidth coordination message,
means for forming and sending an inquiry signal to respective of said multiple destination terminals via said second switch interface means, and
means for receiving respective reply messages from said destination terminals so as to determine whether respective of the destination terminals have sufficient amounts of remaining data capacity to support the data rates for the subchannels.

10. A method for establishing subchannels in a digital network, comprising the steps of:

forming in a memory at a source terminal a setup message having a bandwidth coordination message, bandwidth allocation indicator, identifications of multiple destination terminals, and data rates of subchannels for communicating a data message to the multiple destination terminals;

sending said setup message with said bandwidth coordination message to a digital network switch;

establishing dynamically the subchannels at the digital network switch based on said bandwidth coordination message with the multiple destination terminals identified in said setup message; and sending the data message to the multiple destination terminals via the subchannels.

11. The method of claim 10, wherein:

said forming step, comprises forming said bandwidth coordination message to include a frame having a data structure that includes a control field that contains the bandwidth allocation indicator.

12. The method of claim 10, further comprising the steps of:

receiving at the digital network switch said setup message with the bandwidth coordination message from said source terminal;

holding in said digital network switch a bandwidth coordination mechanism that when executed by the switch processor performs the steps of,
forming an inquiry signal,
sending the inquiry signal to respective of said destination, and
identifying whether respective of the destination terminals can accommodate the data rates identified in the setup message corresponding with respective of the subchannels.

13. The method of claim 12, further comprising the step of:

including a 1×N expansion message in said setup message.

* * * * *